INVENTOR.
RUSTUM ROY

United States Patent Office

3,098,699  
Patented July 23, 1963

3,098,699  
DENSIFICATION OF GLASS, GERMANIUM OXIDE, SILICA OR BORIC ACID  
Rustum Roy, State College, Pa., assignor to Bausch & Lomb Incorporated, Rochester, N.Y., a corporation of New York  
Filed Feb. 3, 1961, Ser. No. 86,961  
4 Claims. (Cl. 18—59.2)

This invention relates to a novel method of densifying glass and like materials, and to novel materials made thereby.

The techniques and results of high pressure treatment of glass and like materials for the purpose of densifying them have recently been published and are of increasing interest to industry.

See, for example, an article in the August 1956 issue of the Journal of Applied Physics, page 943, "Effect of Pressure on Glass Structure," by O. L. Anderson, and an article in the April 1953 issue of that publication, page 45, "Effects of Very High Pressures on Glass," by P. W. Bridgman and I. Simon. This work is of interest from a scientific point of view as leading to a fuller understanding of the molecular structure of glassy materials. It is also of interest from a commercial point of view as leading to the development of a new field, and the prospect of an entirely new class of materials having unique properties, thereby permitting the design of products such as optical devices that could not heretofore be made.

Heretofore, attempts at densification of glasses and like materials have met with only limited success. The processes heretofore applied have been subject to only a limited degree of control, and have not been capable of achieving readily reproducible results, nor a high degree of densification.

It has now been found that unexpectedly improved results as to uniformity, reproducibility, and degree of densification may be achieved by pressing glass in pulverulent form at pressures of about 40,000 to about 150,000 atmospheres. It has also been found that in many instances, depending upon the glass composition, the use of elevated temperatures during pressing produces a marked beneficial effect. The times required for maintaining the materials under pressure are relatively short, only a matter of a few seconds up to about a minute. The initially pulverulent material coalesces during pressing to form a solid, cohesive body of greater density than the particulate density of the starting material.

Figure 1:
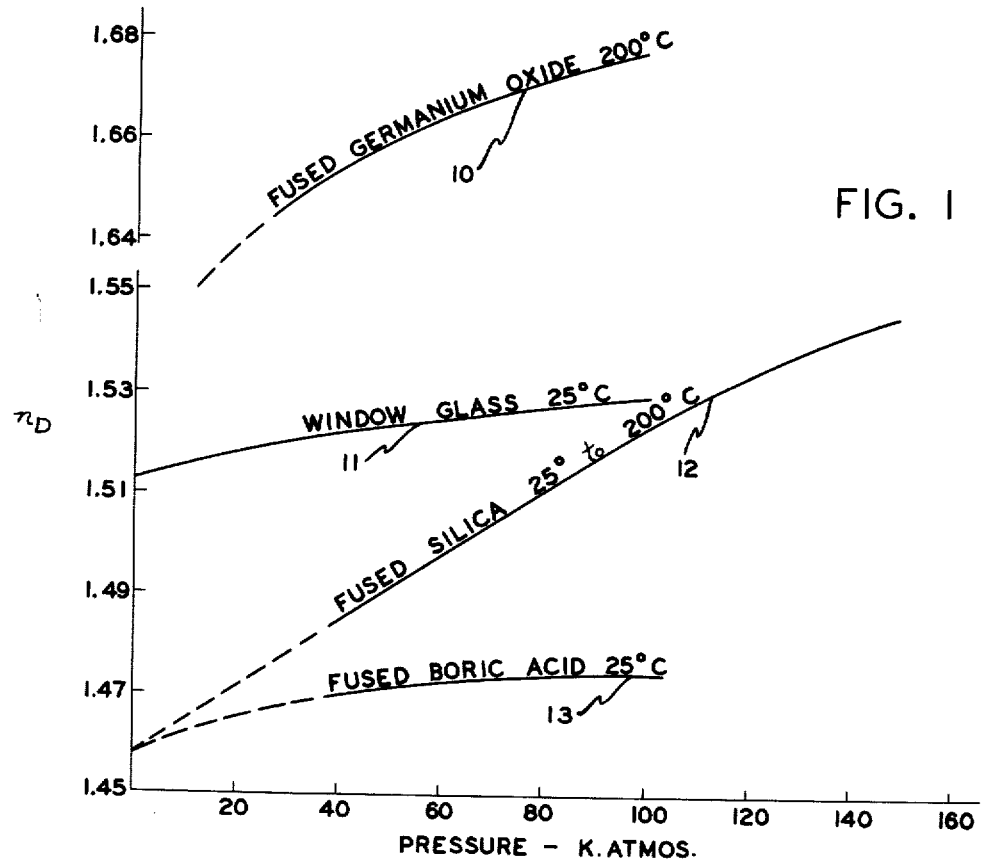
Figure 2:
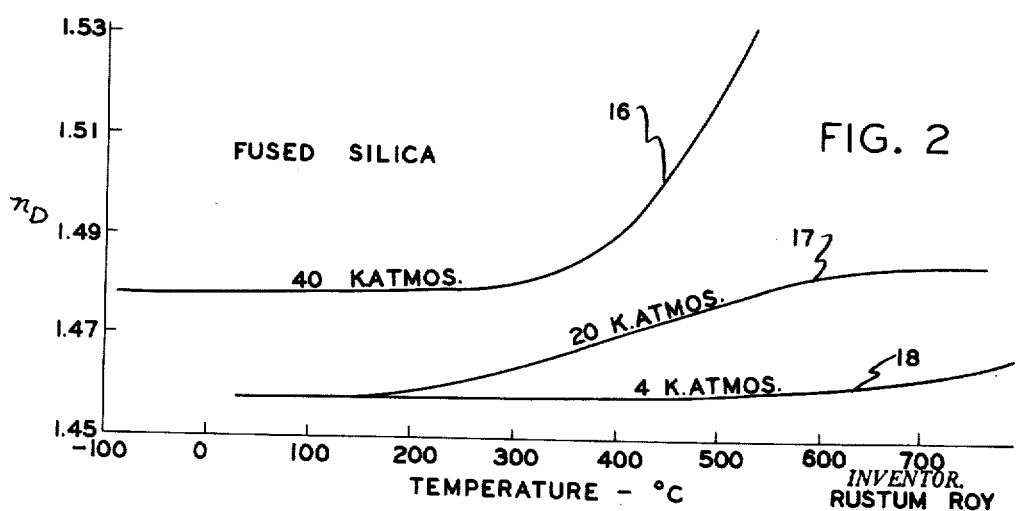

The invention will now be described in greater detail in connection with the accompanying drawing, wherein: FIG. 1 is a chart showing variations in the indices of refraction of various different materials produced according to the invention at various different pressures, the pressures being shown along the abscissa, and the indices of refraction being plotted along the ordinate; and FIG. 2 is a chart illustrating the effects of temperature on the densification of silica glass according to the invention.

The practice of the present invention includes two method steps not previously taught or suggested by others dealing with high pressure densification of materials such as glass. The first step comprises the reduction of the starting material to pulverulent form, and the second novel step comprises the use of elevated temperatures during pressing. By so modifying the previously taught high pressure techniques, it has been possible to produce surprisingly high densifications in glasses of various different compositions, and at relatively low pressures. For example, where Bridgman achieved increases in the diffractive indices of silica glass of up to about 6½% by pressing solid glass bodies at pressures of up to about 200,000 atmospheres, we have achieved an increase in density of about 20% by pressing at about 150,000 atmospheres pressure.

The pressing techniques according to the invention may be identical with those taught by Bridgman in the hereinabove identified article, except for the two distinctive steps specified herein, namely, starting with the initial material in pulverulent form, and, depending on the material, pressing at elevated temperatures of up to about 1000° C. The actual temperature range at which the pressing is to be carried out will depend upon the particular material being pressed, with regard to its softening point, its stability characteristics, or tendency to become devitrified, and with regard to the effect of the elevated temperatures. With some materials, pressing at room temperature appears to provide very close to the same degree of densification as does pressing at moderate elevated temperatures.

The curves 10, 11, 12, and 13 of FIG. 1 illustrate the densification of various different glasses at varying pressures, each curve being determined from a number of measurements of various different samples made from identical starting materials, but pressed at different maximum pressures. The first curve 10 illustrates the increases in the refractive index $n_D$ for fused germanium dioxide pressed at various pressures between about 22,000 and 100,000 atmospheres and at about 200° C. The normal refractive index for germanium dioxide in its natural state is about 1.62. It will be seen from the curve 10 that pressing according to the invention at pressures even as low as about 22,000 atmospheres increases the refractive index of fused germanium dioxide to a value of greater than 1.64, and pressing according to the invention at about 100,000 atmospheres results in a product having a refractive index greater than 1.68.

The second curve 11 illustrates the effect on window glass, which, when pressed at a temperature of about 25° C. and 40,000 atmospheres, suffers an increase in its refractive index from about 1.518 to about 1.526, and when pressed at about 100,000 atmospheres and at 25° C. becomes densified to the extent that its index of refraction increases to about 1.53.

The third curve 12 illustrates the effect of the pressure treatment of the invention on powdered fused quartz at various different pressures ranging from about 40,000 atmospheres to about 150,000 atmospheres, and at temperatures between about 25 and 200° C. It will be seen that it is now possible to densify fused quartz (also called silica glass) to an extent where its refractive index is approximately equal to the natural crystalline quartz, that is, about 1.54 as against the normal refractive index value of 1.48 for this material in its untreated state.

The fourth curve 13 illustrates the increases in density achieved by pressing pulverulent fused boric acid at 25° C. at different pressures between about 50,000 and 100,000 atmospheres.

The curves 16, 17, and 18 shown in FIG. 2 illustrate the effect of temperature in the practice of the invention with respect to pulverulent fused quartz, or silica glass when it is pressed at various different temperatures and pressures. It is noted that, as seen in the first curve 16, a marked increase in densification when pressing at 40,000 atmospheres pressure begins to appear at about 300° C., and that, when pressing at 20,000 atmospheres pressure or less, relatively little densification is achieved despite the use of relatively high temperatures of up to about 800° C.

It will be seen from the curves of FIG. 2 that there appears to be a temperature pressure threshold effect in the pressure densification of fused silica. At pressures of 20,000 atmospheres or less, relatively little increase in density is achieved by the use of increased temperatures. But when the pressure is increased to about 40,000 atmospheres or greater, increases in temperature above 300° C. have a pronounced effect.

It is believed that these effects, besides providing novel materials for optical and other uses, will be useful in developing a more satisfactory concept of the molecular structure of glasses than has heretofore been available.

What is claimed is:

1. The method of densifying germanium oxide glass comprising the steps of, reducing the germanium oxide material to a pulverulent mass, pressing the pulverulent mass of material to a pressure within the range of 22,000 to 100,000 atmospheres, heating the pulverulent mass of material to a temperature of approximately 200° C. during the pressing step, and maintaining the pressure on the material for a time of a few seconds and not exceeding one minute.

2. The method of densifying a window glass material comprising the steps of, reducing window glass material to a pulverulent mass, pressing the pulverulent mass at a pressure of approximately 40,000 atmospheres, and maintaining the pressure on the material for a period of a few seconds and no greater than a minute.

3. The method of densifying a boric acid glass material comprising, reducing a mass of boric acid glass material to a pulverulent mass, pressing the pulverulent mass of material between the pressure range of 50,000 to 100,000 atmospheres, maintaining a pressure of said material for a time of a few seconds and no greater than one minute.

4. The method of densifying silica material comprising the steps, reducing a mass of fused silica material to a pulverulent mass, pressing the pulverulent mass of silica at a pressure within the range of 40,000 atmospheres to 150,000 atmospheres elevating the temperature of the pulverulent mass at a temperature within the range of 25° C.–200° C., maintaining a pressure on said material for a time of a few seconds and no greater than one minute.

References Cited in the file of this patent

UNITED STATES PATENTS

| 2,247,270 | Bair | June 24, 1941 |
| 2,865,139 | Anderson | Dec. 23, 1958 |

FOREIGN PATENTS

| 529,930 | Great Britain | Dec. 2, 1940 |

OTHER REFERENCES

Tooley Handbook of Glass Mfg., publ. 1953 by Ogden Publ. Co., New York city, p. 62.

MacKenzie: Modern Aspects of the Vitreous State, 1960, by Butterworths, London, p. 189.

UNITED STATES PATENT OFFICE
CERTIFICATE OF CORRECTION

Patent No. 3,098,699

July 23, 1963

Rustum Roy

It is hereby certified that error appears in the above numbered patent requiring correction and that the said Letters Patent should read as corrected below.

Column 4, line 7, for "at" read -- to --.

Signed and sealed this 4th day of February 1964.

(SEAL)
Attest:
ERNEST W. SWIDER

Attesting Officer

EDWIN L. REYNOLDS

Acting Commissioner of Patents